(No Model.) 3 Sheets—Sheet 1.

A. MILLER.
APPARATUS FOR MANUFACTURING SALT.

No. 428,121. Patented May 20, 1890.

Witnesses:
Joseph W. Roe
David Haynes

Inventor:
Alexander Miller
by attorney
Henry T. Brown (No Model.) 3 Sheets—Sheet 2.

A. MILLER.
APPARATUS FOR MANUFACTURING SALT.

No. 428,121. Patented May 20, 1890.

Witnesses:
Joseph W. Roe.
Fredk Haynes

Inventor:
Alexander Miller
by attorney
Henry J. Brown (No Model.) 3 Sheets—Sheet 3.
A. MILLER.
APPARATUS FOR MANUFACTURING SALT.

No. 428,121. Patented May 20, 1890.

Witnesses:
Joseph W. Roe.
Fred Haynes

Inventor:
Alexander Miller
By attorney
Henry T. Brown

UNITED STATES PATENT OFFICE.

ALEXANDER MILLER, OF NEW YORK, N. Y., ASSIGNOR OF ONE-HALF TO ROBERT DEELEY, OF SAME PLACE.

APPARATUS FOR MANUFACTURING SALT.

SPECIFICATION forming part of Letters Patent No. 428,121, dated May 20, 1890.

Application filed August 16, 1888. Serial No. 282,908. (No model.)

*To all whom it may concern:*

Be it known that I, ALEXANDER MILLER, of the city and county of New York, in the State of New York, have invented a new and useful Improvement in Apparatus for Manufacturing Salt, of which the following is a specification, reference being had to the accompanying drawings.

I will proceed to describe my invention with reference to the drawings, which represent it embodied in an apparatus for carrying out an improved process, which forms the subject-matter of a separate invention, for which I have made another application for Letters Patent, Serial No. 282,907, of even date herewith, and I will afterward point out the novel features in claims.

Figure 1:
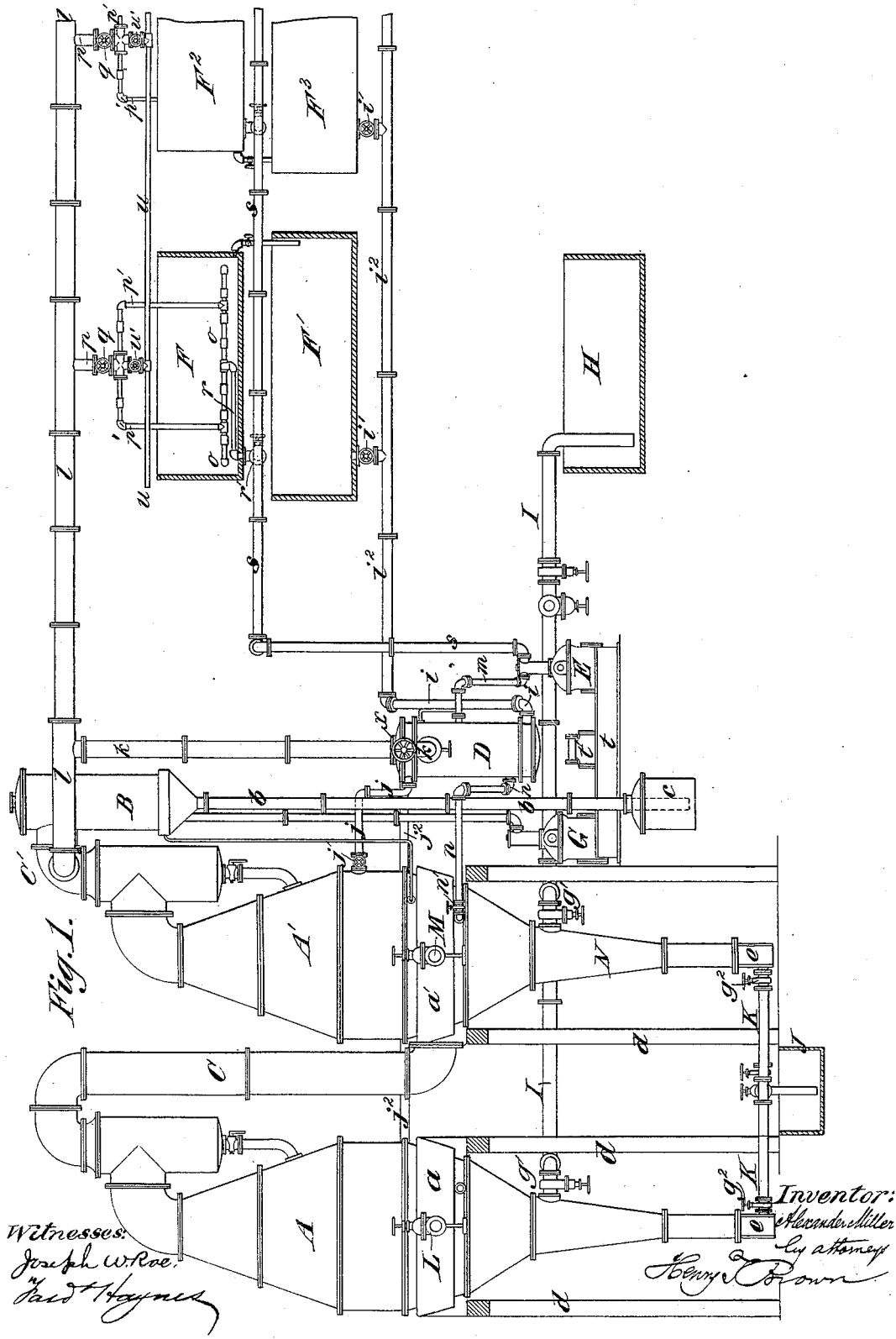
Figure 2:
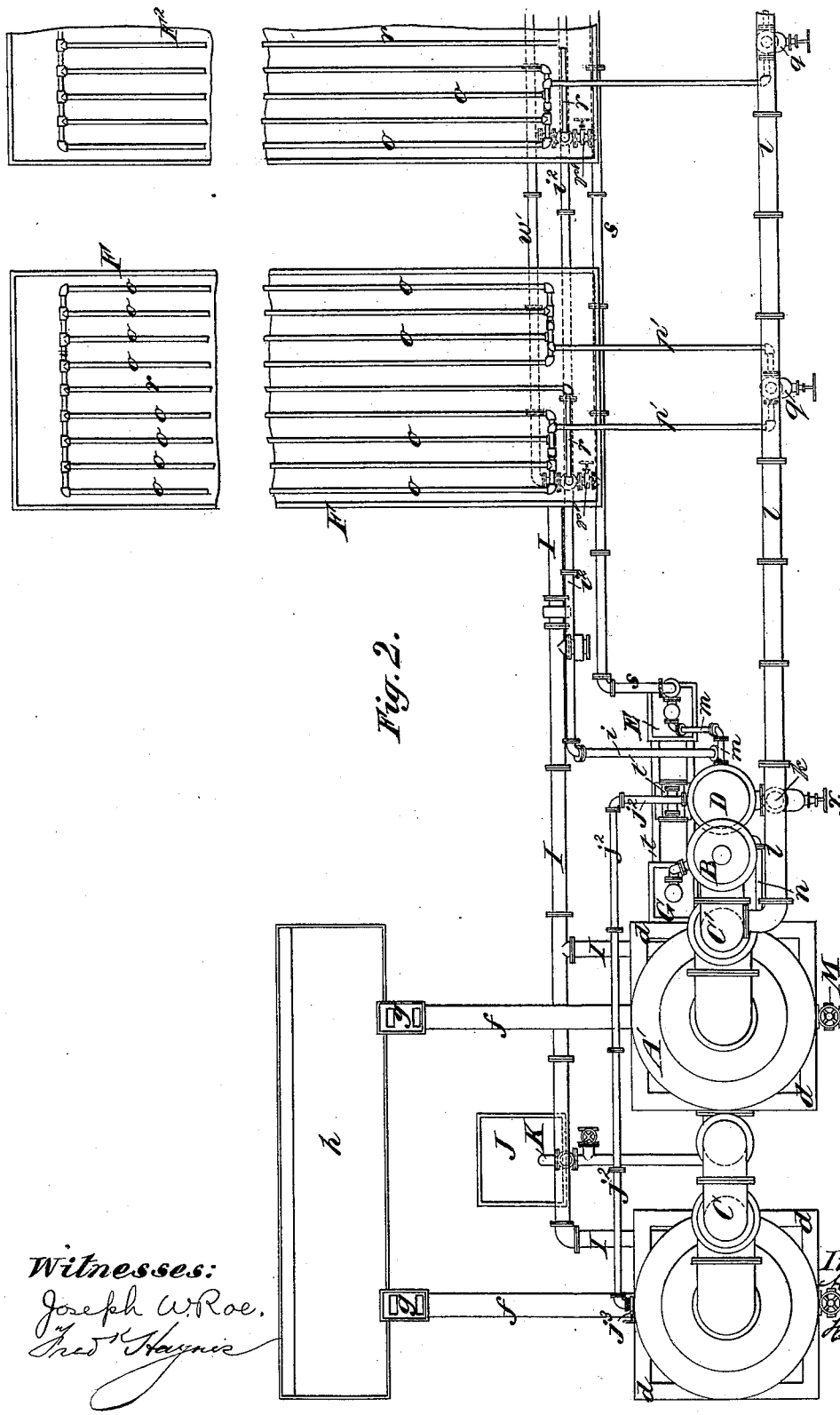
Figure 3:
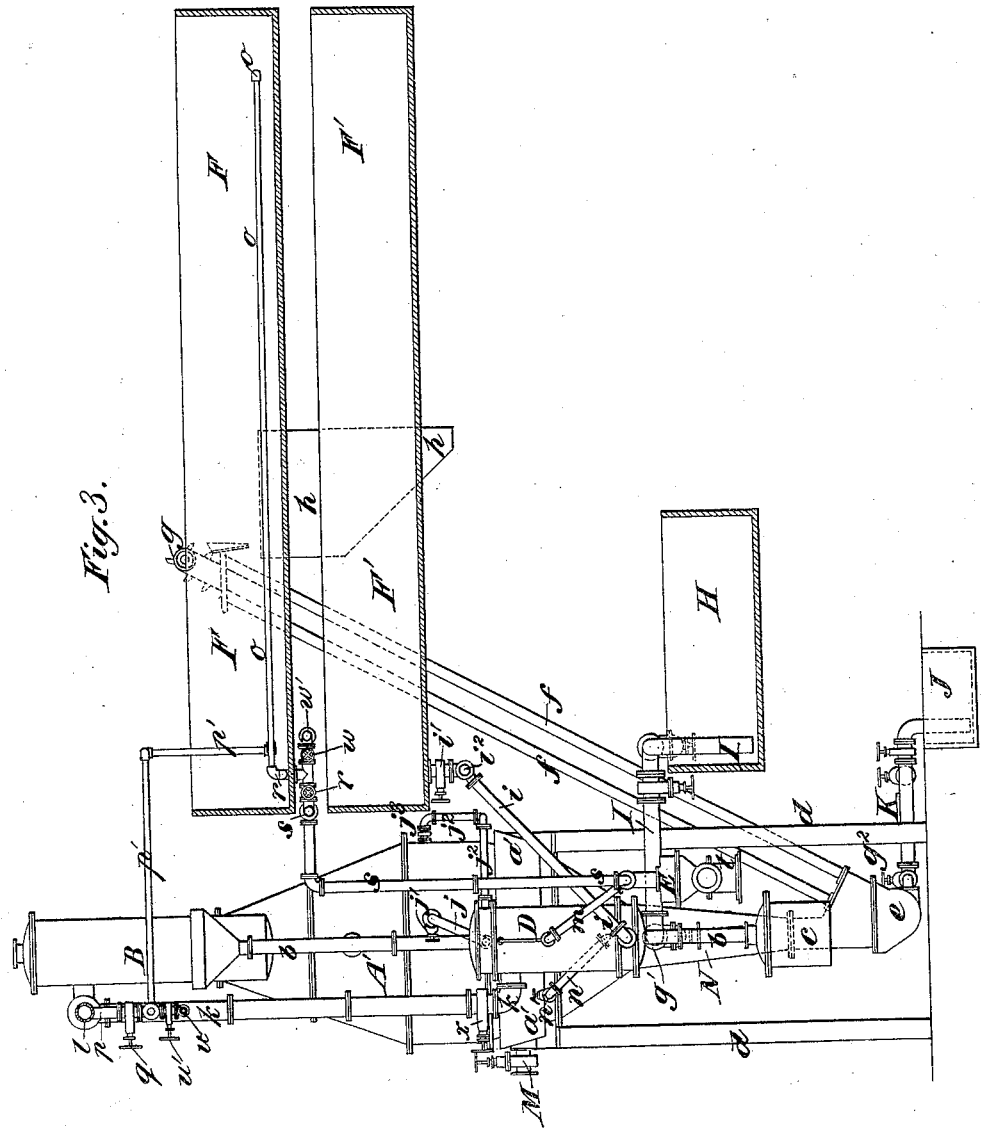

Figure 1 represents a side elevation, partly in section, of an apparatus embodying my invention. Figs. 2 and 3 represent corresponding plan and end views of the same apparatus.

Like letters of reference indicate corresponding parts in the several figures.

The apparatus represented in the drawings, having more than one evaporating-pan or evaporating-vessel—namely, A and A', the vapors of concentration from one pan A being utilized to evaporate the contents of another pan A'—constitutes what is called a "multiple-effect" evaporating apparatus. In this example of my invention the vessels or pans A and A' are of the variety known as "vacuum-pans," a partial vacuum being maintained therein when in operation.

C is a vapor pipe or passage through which the vapors from the vacuum pan or vessel A pass into the heating-belt $a'$ of the vacuum-pan A'.

C' is a vapor pipe or passage through which the vapors from the pan or vessel A' pass into the condenser B, which may be, and, though not represented in detail, is supposed to be, what is commonly known as the "dry vacuum" condenser.

$b$ is the condenser leg-pipe, through which the water of condensation descends to the leg-pipe seal-tank $c$, whence it passes away to a drainage basin or sewer.

$d$ designates frame-work upon which the pans are supported. The parts of the vacuum-pans which extend below the heating-belts $a$ and $a'$, sometimes called the "pan leg-pipes," have the form of elongated funnels for providing comparatively cool and quiet bodies of liquid to facilitate the separation and deposit of the solid precipitate, and they terminate at the bottom in pits or pockets $e$ $e$. From the pockets $e$ $e$ hollow columns $f$ $f$ open at their upper ends to the atmosphere, extend upward to or near the level of the top of the pans, and contain elevating apparatus $g$ $g$—in this example a chain of buckets, by which the crystals of salt are carried up from the pockets $e$ $e$ and discharged into the tank $h$.

D designates a heater through which the cold purified brine to be evaporated passes before entering the pan; $i$, the brine-inlet pipe, through which the cold purified brine enters the heater; $j$, the pipe by which the same liquid is conducted from the heater into the vacuum-pan; $k$, a pipe branching from the branch vapor-pipe $l$ to convey vapor into the heater for the purpose of heating the liquid to a certain degree before it enters the pan; $m$, an exhaust-pipe connecting the heater with the air-pump E, through which pipe the waters of condensation escape from the heater, and through which a partial vacuum is maintained in the heater slightly greater than that of the pans, to produce a current through the branch pipe $k$; $n$, a pipe connecting the heating-belt of the pan A' with the heater, and through which the waters of condensation from said heating-belt may pass into the heater, imparting its heat to the liquid therein.

$n'$ is a stop-cock for regulating the flow of the waters of condensation from the heating-belt through pipe $n$ to the heater D. In practice it will be found convenient to let the stop-cock $n'$ remain open slightly less than enough to allow the waters of condensation to drain freely off into the heater, and when the water accumulates in the heating-belt to open wide the cock $n'$ and let the accumulated water discharge itself at once, care being taken to close or partially close the said cock $n'$ in due time and sufficiently to prevent steam from the heating-belt from entering the heater and vitiating the vacuum therein.

F, F', F², and F³ designate the settlingtanks or "settlers." In this example of my invention the settlers are arranged in pairs, one tank or settler above another, because in practice it is more convenient to heat the impure brine in an upper tank F or F² and discharge it when heated into a lower tank F' or F³ and allow it to settle in the latter than it would be to permit it to settle in the tanks containing heating-pipes, from among which it would be difficult to remove the precipitated impurities.

$o\ o$ are heating-pipes arranged within and near the bottom of the upper settlers or tanks F F². To effect a saving of fuel by utilizing the heat of a part of the vapors produced in the pans by the evaporation of the purified brine therein, which heat would otherwise be lost in the condenser, I conduct the said vapor into the heating-pipes $o\ o$. In the example represented in the drawings I tap a vapor-pipe, preferably a vapor-pipe C', proceeding from the last pan A' of a multiple-effect series by a branch vapor-pipe $l$, extending along the line of settlers, and connect the heating-pipes $o\ o$ therewith by connecting-pipes $p$ and distributing-pipes $p'$.

$q\ q$ indicate stop-valves by which the passage of vapor into the heating-pipes $o\ o$ is regulated.

$r\ r$ are pipes through which the waters of vapor condensed in pipes $o\ o$ and vapor which passes through said pipes uncondensed are discharged into pipes $s\ s$, leading to the air-pump E.

$r'\ r'$ are stop-valves by which said discharge may be regulated.

The vacuum maintained by the air-pump E is slightly greater than that maintained in the pan A' by the air-pump G, and a current is thereby maintained toward the air-pump E through all pipes connecting it with the vapor-pipe C', notably through the heating-pipes $o\ o$ of the settlers and through the heater D, as hereinbefore mentioned.

In the drawings the air-pumps E and G are represented as attached to a common bed $t$, to be driven by the steam-cylinder $t'$, fixed in line with the air-pump and on the same bed.

To insure the precipitation of the impurities in the settlers without causing a precipitation of salt therewith, the brine must be heated nearly to the boiling-point. With a lower temperature the impurities will not precipitate. With a higher temperature salt will be thrown down with the impurities. Therefore, inasmuch as the temperature of the vapors from the pipe C' corresponds with the degree of vacuum maintained in the pan A'—say 135° Fahrenheit—the impure brine in the settlers will not be sufficiently heated thereby, and to supply the additional heat required I introduce live steam or steam of a higher temperature into the pipes $o\ o$ after the impure brine has been partially heated by vapor from the pan A'.

$u\ u$ designate pipes communicating with the pipes $o\ o$ through stop-valves $u'\ u'$ and distributing-pipes $p'\ p'$ for conveying steam of high temperature from any convenient source of supply into said pipes $o\ o$. The live steam or steam of high temperature or the waters of condensation therefrom do not pass into or through the air-pump, but are allowed to escape through the stop-valve $w$ and into pipe $w'$, and thence to waste or to a tank for feeding a steam-boiler.

When the brine in the upper settlers or tanks F F² has been heated to a temperature corresponding to that of the vapor from pan A', the stop-valves $q$ and $r'$ may be closed, shutting off communication with the vapor-pipe and air-pump, and the stop-valves $u'$ and $w$ opened, admitting live or higher-temperature steam to the pipes $o\ o$, and permitting the same to discharge through the pipe $w'$. When the brine has been sufficiently heated in the upper settlers F F², it is passed into the lower settlers F' F³, where it is allowed to stand for a time sufficient for the solid particles constituting the impurities to fall to the bottom, during which time the brine thus purified cools down to or nearly to the temperature of the surrounding atmosphere. The cold purified brine from the lower settlers is discharged through a stop-valve $i'$ and pipes $i^2$ and $i$ into the lower part of heater D, and up through a number of copper tubes in said heater, the upper portions of which tubes are surrounded by vapor from the pan passing into the heater through pipe $k$ and stop or regulating valve $x$, and the lower portions of which tubes are surrounded by the waters of condensation from the heating drum or belt of pan A'. The cold purified brine in passing through the heater absorbs a portion of heat from the said vapor and from said waters of condensation, and passes out of the heater through the pipe $j$ into the pan A'. The quantity of the supply of the heated and purified brine to the pan may be regulated by the stop cock or valve $j'$, the other pans of a multiple-effect series being fed or supplied with the purified brine through pipes $j^2$ and valves $j^3$.

To clean the pans A or A', they must be emptied of brine, to provide for which I place a tank or tanks H, large enough to hold all the contents of the pans, above the valves $g'$ of the discharge-pipe I, said valves $g'$ being provided to regulate the discharge through said pipes. To receive the brine which would remain in the pan leg-pipes N, or parts of the pans below the level of valves $g'$, and the brine which would remain in the lower part of the hollow columns $f\ f$ below said level, I provide a tank J and pipes K, proceeding from near the bottom of pockets $e\ e$ and discharging into said tank J, said pipe K being provided with stop-valves $g^2$ for regulating said discharge. After the pans have been cleaned the pan A, there being no vacuum therein, must be refilled with purified brine coming through the heater in the regular manner. A vacuum having been formed in pan A' by starting the air-pump G, opening the valve $g^2$ will permit the brine contained in tank J to be drawn up into said pan A'. If the said valve $g^2$ of pan A' be then closed and the valve $g'$ of the same pan be opened, the additional quantity of brine required to fill the pan up to the boiling-level will be drawn from tanks H. The inflow of brine through heater D being prevented, the supply of brine from tank H to pan A' can be regulated by the valve $g'$ of said pan, as the evaporation proceeds until all the brine from tank H has entered the pan, and the tank thus emptied is ready for the next cleaning operation. After the tank H has been thus emptied the pan A' will be supplied with brine from the settlers through heater D, said supply being regulated by stop-valve $j'$. The height of the lower settlers is such that the brine will flow automatically and freely, impelled by the force of gravity, into the pans and fill them to the boiling-level at any time, as required.

The difference in level between the surface of the liquid or boiling-level of the pans and the bottom of tank J is so great, as pans are usually constructed, that the pressure of the atmosphere is not sufficient to force brine from tank J up to said boiling-level against the force of gravity of the brine and the pressure of the vapor in the partial vacuum of the pan; hence the necessity for the larger tanks H at a higher level, as hereinbefore set forth.

To utilize the exhaust-steam from a steam-engine in the evaporation of brine, I provide one or more openings into the heating-belts of the pans of a multiple-effect series with stop-valves L and M, to which the exhaust-pipes may be connected. I introduce this exhaust-steam, preferably, into the last pan A' of a series through opening and valve M, for the reason that in the heating-belt of that pan the heating-vapors are at their lowest tension or pressure, while in the heating-belts of the other pans of a multiple-effect series the tension of the vapors is preferably higher than that of the atmosphere, in order to get a larger duty from the heating-surface. In fact, steam from the boilers at any desired pressure may be introduced through valve L into the belt of the first pan A of a series. The exhaust-steam introduced into the heating-belt of a pan mingles with the vapors therein, which enter through the vapor-pipe from the next preceding pan, and the area of heating-surface must be proportioned accordingly.

What I claim as new, and desire to secure by Letters Patent, is—

1. The combination, with a vacuum-pan, of two settlers or purifiers, one above the other, a vapor pipe or passage connecting said vacuum-pan with the upper of said settlers or purifiers, and through which the vapor from the vacuum-pan passes in order to heat the brine in said settler or purifier, a heater through which the brine from the lower of said settlers or purifiers may automatically flow to the vacuum-pan, a pipe or passage for conveying vapors from the vacuum-pan to said heater, a pipe or passage for conveying waters of condensation from the vacuum-pan to said heater, and a pipe or passage for conveying waters of condensation and vapor from the upper of said settlers or purifiers to the heater, substantially as specified.

2. The combination, with a vacuum-pan, of two settlers or purifiers, one above the other, a vapor pipe or passage leading from the vacuum-pan to the upper of said settlers or purifiers, and through which vapors will be conveyed from the vacuum-pan in order to heat the brine in said settler or purifier, a communication between the lower of said settlers or purifiers and the vacuum-pan, by which the brine is conveyed from the said settler or purifier to the vacuum-pan, heating apparatus independent of the vacuum-pan, a pipe for affording communication between said heating apparatus and the upper of said settlers or purifiers, through which pipe live steam will be conveyed to said upper settler or purifier for the purpose of heating the brine therein, a cock in said vapor pipe or passage, and a cock in said last-named pipe, whereby vapor from the vacuum-pan may be cut off when the live steam is admitted, and vice versa, substantially as specified.

3. The combination, with a vacuum-pan having a leg-pipe extending below the level from which the pressure of the atmosphere could force the brine up to the boiling-level in the pan, of an upper tank located near the level of the top of the leg-pipe to receive the contents of the pan above that level and return the same when a vacuum is formed, and a lower tank situated below the lower end of the leg-pipe to receive the contents of said leg-pipe and return the same before the contents of the upper tank are returned, substantially as specified.

ALEX. MILLER.

Witnesses:
MINERT H. LINDEMAN,
ARTHUR H. GAMBLIN.